United States Patent
Shanmugam et al.

(10) Patent No.: US 9,871,861 B1
(45) Date of Patent: *Jan. 16, 2018

(54) METHOD AND SYSTEM FOR TRANSFERRING THE HOSTING OF AN ONLINE SERVICE TO ELASTIC VIRTUAL COMPUTING RESOURCES FROM A DATA CENTER AND WITHOUT SERVICE INTERRUPTION

(71) Applicant: Intuit Inc., Mountain View, CA (US)

(72) Inventors: Elangovan Shanmugam, Cupertino, CA (US); Luu Tran, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,459

(22) Filed: Dec. 2, 2016

Related U.S. Application Data

(63) Continuation of application No. 14/594,442, filed on Jan. 12, 2015, now Pat. No. 9,560,132.

(51) Int. Cl.
| | |
|---|---|
| G06F 15/16 | (2006.01) |
| H04L 29/08 | (2006.01) |
| H04L 12/26 | (2006.01) |
| H04L 29/06 | (2006.01) |
| G06F 9/455 | (2006.01) |

(52) U.S. Cl.
CPC ...... H04L 67/1095 (2013.01); G06F 9/45558 (2013.01); H04L 43/10 (2013.01); H04L 67/42 (2013.01)

(58) Field of Classification Search
CPC ..... H04L 63/1441; H04L 63/10; H04L 43/10; G06Q 40/00; G06Q 50/10
USPC .................................................. 709/203, 220
See application file for complete search history.

(56) References Cited

U.S. PATENT DOCUMENTS

| | | | |
|---|---|---|---|
| 2015/0128295 A1* | 5/2015 | Gryb ....................... | G06F 21/64 726/30 |
| 2015/0347759 A1* | 12/2015 | Cabrera ................ | G06F 21/577 726/25 |
| 2016/0036795 A1* | 2/2016 | Lietz ....................... | H04L 63/08 726/4 |

* cited by examiner

*Primary Examiner* — Frantz Jean
(74) *Attorney, Agent, or Firm* — Hawley Troxell Ennis & Hawley LLP; Philip McKay

(57) ABSTRACT

A method and system transfers the hosting of online services to a virtual asset computing environment from a hardware asset computing environment, according to one embodiment. The method and system transfers a secondary copy of application data to a storage device, and delivers the storage device to a second computing system from the first computing system using a parcel courier, according to one embodiment. The method and system receives, with the second computing system, the secondary copy of the application data from the storage device, and configures virtual assets to execute a second instance of the online services application to enable the second computing system to provide the online services to the multiple users, according to one embodiment. The method and system configures the second computing system as a primary service provider, according to one embodiment.

27 Claims, 4 Drawing Sheets

METHOD AND SYSTEM FOR TRANSFERRING THE HOSTING OF AN ONLINE SERVICE TO ELASTIC VIRTUAL COMPUTING RESOURCES FROM A DATA CENTER AND WITHOUT SERVICE INTERRUPTION

RELATED APPLICATION

This application is a continuation of Shanmugam, et al., U.S. patent application Ser. No. 14/594,442, U.S. Pat. No. 9,560,132, filed on Jan. 12, 2015, entitled "METHOD AND SYSTEM FOR TRANSFERRING THE HOSTING OF FINANCIAL SERVICE TO ELASTIC VIRTUAL COMPUTING RESOURCES FROM A DATA CENTER AND WITHOUT SERVICE INTERRUPTION", which is herein incorporated by reference in its entirety as if it were fully set forth herein.

BACKGROUND

Successful online services can be difficult for service providers to maintain well. In particular, if online service providers do not anticipate customer growth by procuring and maintaining computing resources to handle growth, the online service may become sluggish, may improperly handle customer data, or may have to reject potential customers. For example, some of the successfully operating online financial services have 15 million users, 2.5 million active users, and consume 60 terabytes of financial data. While such online services experience growth in users and traffic, the growth can be sporadic and difficult to predict. Thus, if the service provider purchases excessive quantities of computing resources in preparation for growth, then the service provider reduces its profits while paying for cooling costs, power consumption, maintenance fees, and initial purchase fees for all of the hardware and software computing resources that are in standby until customer usage actually consumes the additional computing resources. On the other hand, if the service provider simply maintains enough resources to service the current amount of user traffic, the quality of the online service may be compromised by insufficient bandwidth, interruptions in service, improper management or loss of user data, and the like.

While cloud computing environments offer an expandable resource platform for online service providers to use to launch new online services, many existing online services have significant numbers of users and are hosted from traditional data centers. Because of the risks of extensive downtimes of online services, the risks of compromising user data to the cloud, and the risks of unknown de-bugging periods, established online services have been reluctant to move to cloud computing environments.

What is needed is a system and method for transferring the hosting of financial service to an elastic virtual computing environment (e.g., the cloud) from a hardware-based computing environment, without service interruption to the financial service, according to one embodiment.

SUMMARY

Embodiments of the present disclosure address some of the shortcomings associated with traditional techniques for hosting online or Internet-based services, by providing systems and methods for transferring the hosting of an online financial service to a virtual asset computing environment, from a hardware asset computing environment. Transitioning financial service hosting from a hardware asset computing environment to a virtual asset computing environment provides inherent disaster recovery, reduces cost of hosting, provides faster scalability, and ensures availability of the financial service, according to one embodiment. As used herein, the phrases hosting a financial services application, hosting online financial services, and hosting financial services are used interchangeably to represent providing financial services to users through one or more networks from a hardware asset computing environment or from a virtual asset computing environment, according to one embodiment. The system and method of transferring enables the online financial service to be heterogeneously hosted by both a virtual asset computing environment (e.g., a cloud computing environment) and a hardware asset computing environment (e.g., a traditional data center) to provide financial services to users, according to one embodiment. The virtual asset computing environment dynamically allocates and de-allocates virtual assets to tenants of the virtual asset computing environment, to enable the tenants to rent, control, and/or manage as many virtual asset resources as desired for hosting online services, according to one embodiment. A virtual asset includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices.

The systems and methods of transferring at least part of the hosting of a financial service to a virtual asset computing environment enables the financial service provider to dynamically expand computing resources for the financial service, without paying for and maintaining standby computing resources, according to one embodiment. The financial service provider may dynamically increase the virtual asset computing resources in response to increased user traffic or bandwidth, in response to anticipated increase in users, to support the release of new features, to support anticipated bandwidth consumption, or the like, according to one embodiment. The systems and methods also enable the transfer to the virtual asset computing environment to occur without the time delays associated with acquiring additional computing resources, according to one embodiment.

The system and method of transferring hosting of a financial service to a virtual computing environment includes, but is not limited to, compartmentalizing the physical/hardware asset computing environment into hardware asset groups, encrypting application data from one of the hardware asset groups, and transferring a virtual asset configuration script and the encrypted application data to the virtual asset computing environment using a parcel courier, e.g., on a data storage device, according to one embodiment. The system and method of transferring also includes, but is not limited to, loading the virtual asset configuration script and the encrypted application data into a virtual asset computing environment, and executing the virtual asset configuration script to configure one or more virtual assets to function similar to the hardware asset groups, according to one embodiment. The system and method also includes, but is not limited to, synchronizing virtual asset databases with the hardware asset databases (physical asset databases), testing the operation of the financial service hosted from the virtual asset computing environment, and redirecting financial service traffic to the virtual asset computing environment as the primary service provider for one of the hardware asset groups, according to one embodiment.

A virtual asset manager is configured to manage the dynamic expansion and/or retraction of virtual assets that are allocated to support the operation of the financial service from the virtual asset computing environment, according to one embodiment. The virtual asset manager monitors traffic analytics for the financial service to determine if the quantity of virtual assets allocated to the operation of the financial service is adequate. If the virtual assets allocated to the operation of the financial service are excessive, the virtual asset manager is configured to reduce the quantity of virtual assets that are allocated to supporting the operation of the financial service, according to one embodiment. If the virtual asset manager determines that the quantity of virtual assets that are allocated to the operation of the financial service is insufficient, the virtual asset manager increases the quantity of virtual assets that are allocated to the operation of the financial service, according to one embodiment. In one embodiment, increasing the quantity of virtual assets includes increasing a quantity of virtual assets that are configured as Internet interface servers, increasing a quantity of virtual assets that are configured as application servers, and/or increasing the number of virtual assets that are configured as database servers for the financial service, according to one embodiment.

The method of transferring hosting of the financial service to the virtual asset computing environment, from the hardware asset computing environment may be repeated, one hardware asset group at a time, until the entirety of the financial service is primarily hosted from the virtual asset computing environment and/or is secondarily hosted from the hardware asset computing environment, according to one embodiment.

By transferring the hosting of a financial service from a hardware asset computing environment to a virtual asset computing environment, implementation of embodiments of the present disclosure allows for significant improvement to the field of financial management, data flow, data distribution, and distributive computing. As one illustrative example, by enabling the full or partial transfer of established online services to cloud computing environments, implementation of embodiments of the present disclosure allows for growth in the cloud computing industry, allows for service providers to reduce the quantity of standby computing equipment, and therefore reduces the amount of electricity, space, and cost associated with equipment that is configured to accommodate fluctuations in customer base and in customer usage of an online service. As a result, embodiments of the present disclosure allow for improved/efficient processor use, more efficient use of memory access and data storage capabilities, reduced communication channel bandwidth utilization, and therefore faster communications connections. Consequently, computing and communication systems implementing and/or providing the embodiments of the present disclosure are transformed into faster and more operationally efficient devices and systems.

Figure 1:
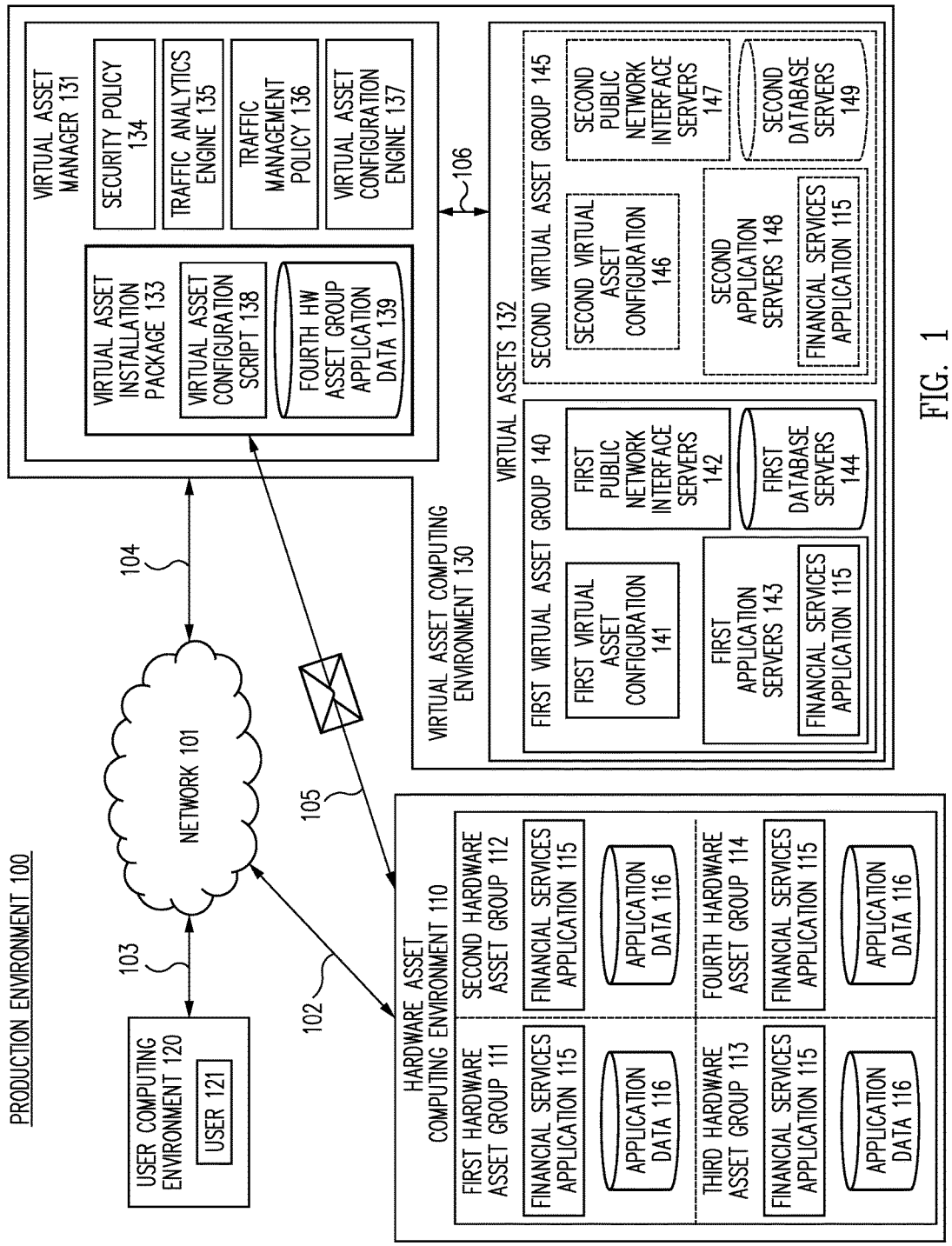
FIG. 1 is a block diagram of software architecture for transferring the hosting of financial services to a virtual asset computing environment from a hardware asset computing environment, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein describe systems and processes suitable for transferring the hosting of an online financial service to a virtual asset computing environment, from a hardware asset computing environment, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for transferring the hosting of a financial service to a virtual asset computing environment, from a hardware asset computing environment, according to one embodiment. Transitioning financial service hosting from a hardware asset computing environment to a virtual asset computing environment provides inherent disaster recovery, reduces cost of hosting, provides faster scalability, and ensures availability of the financial service, according to one embodiment. The transfer enables the financial service to be heterogeneously hosted within the production environment 100 by both a virtual asset computing environment (e.g., a cloud computing environment) and a hardware asset computing environment (e.g., a traditional data center) to provide financial services to users, according to one embodiment. As used herein, the phrases hosting a financial services application, hosting online financial services, and hosting financial services are used interchangeably to represent providing financial services to users through one or more networks from a hardware asset computing environment and/or from a virtual asset computing environment, according to one embodiment. The production environment 100 enables the transfer of at least part of the hosting of the financial service to a virtual asset computing environment so that the financial service provider may dynamically expand and contract computing resources that are rented and/or allocated for operating the financial service, according to one embodiment. Such an arrangement or configuration, enables the financial service provider to operate more economically and in an elastic computing environment, while providing uninterrupted financial services to users (e.g., subscribers or customers), according to one embodiment. The system and method of transferring the hosting of a financial service to a virtual computing environment includes, but is not limited to, compartmentalizing the hardware asset computing environment into hardware asset groups; encrypting application data; transferring the encrypted application data to the virtual asset computing environment using a parcel courier, e.g., on a data storage device; installing the encrypted data into database servers in the virtual asset computing environment; synchronizing virtual asset databases with the hardware asset databases; and redirecting financial service traffic to the virtual asset computing environment as a primary service provider, according to one embodiment. While the disclosed embodiments are directed towards transferring the hosting of financial services, the disclosed techniques may be applied to other online services, according to one embodiment. Additional embodiments are disclosed hereafter.

As discussed above, there are various long standing shortcomings associated with traditional techniques for hosting an online service. Successful online services can be difficult for service providers to maintain well because successful online services can experience sporadic growth in users and traffic. If the service provider purchases excessive quantities of computing resources in preparation for growth, then the service provider reduces its profits while paying for cooling costs, power consumption, maintenance fees, and initial purchase fees for all of the hardware and software computing resources that are in standby. On the other hand, if the service provider simply maintains enough resources to service the current amount of user traffic, the quality of the online service may be compromised by insufficient bandwidth, interruptions in service, improper management or loss of user data, and the like, if user traffic increases suddenly.

By transferring the hosting of a financial service from a hardware asset computing environment to a virtual asset computing environment, implementation of embodiments of the present disclosure allows for significant improvement to the field of financial management, data flow, data distribution, and distributive computing. As one illustrative example, by enabling the full or partial transfer of established online services to cloud computing environments, implementation of embodiments of the present disclosure allows for growth in the cloud computing industry, allows for service providers to reduce the quantity of standby computing equipment, and therefore reduces the amount of electricity, space, and cost associated with equipment that is configured to accommodate fluctuations in customer base and in customer usage of an online service. As a result, embodiments of the present disclosure allow for improved/efficient processor use, more efficient use of memory access and data storage capabilities, reduced communication channel bandwidth utilization, and therefore faster communications connections. Consequently, computing and communication systems implementing and/or providing the embodiments of the present disclosure are transformed into faster and more operationally efficient devices and systems.

The production environment 100 includes several computing environments for transferring the hosting of a financial service to a virtual asset computing environment, from a hardware asset computing environment, according to one embodiment. The production environment 100 includes a hardware asset computing environment 110 that is configured to provide financial services to a user computing environment 120, according to one embodiment. The production environment 100 also includes a virtual asset computing environment 130 that is configured to receive financial application data from the hardware asset computing environment 110 to also provide financial services to users, e.g., to user 121 of the user computing environment 120, according to one embodiment. The production environment 100 is configured to transfer at least part of the hosting of financial services to the virtual asset computing environment 130 from the hardware asset computing environment 110, according to one embodiment. The computing environments 110-130 are communicatively coupled to each other through a network 101 and through communications channels 102, 103, and 104, according to one embodiment.

The hardware asset computing environment 110 is a data center that is configured for providing financial services to users over the network 101, in one embodiment. The hardware asset computing environment 110 includes computing systems such as servers, computing cabinets, power supplies, routers, cooling equipment, and the like, configured for providing financial services to users, according to one embodiment. According to various embodiments, the financial services hosted by the hardware asset computing environment 110 include, but are not limited to, consumer financial management, financial management of a financial institution, business financial management, business operations management, and customer support for the financial services. The hardware asset computing environment 110 is configured to provide the financial services to various types of computing environments, including desktop computing devices, laptop computing devices, tablet computing devices, smart phone computing devices, and other computing devices capable of interacting with a web interface, according to one embodiment.

The hardware asset computing environment 110 compartmentalizes or uses "podification" to separate the hardware assets into functional groups, to provide financial services, according to one embodiment. The hardware asset computing environment 110 includes a first hardware asset group 111, a second hardware asset group 112, a third hardware asset group 113, and a fourth hardware asset group 114, according to one embodiment. While the hardware asset computing environment 110 is represented with four different hardware asset groups, these groups are illustrative of compartmentalization and represent both fewer functional groups (e.g., one or two) and more functional groups (e.g., 10-20), according to various embodiments. In one embodiment, the hardware asset groups 111-114 are compartmentalized so that cross-group communications are not used while hosting the financial services, according to one embodiment. In other words, each of the hardware asset groups 111-114 include a self-contained architecture that enables individual transfer of the hardware asset groups to the virtual asset computing environment 130, according to one embodiment.

Each of the hardware asset groups 111-114 include a number of servers and databases for executing financial service applications and for providing financial services to users, according to one embodiment. For example, each of the hardware asset groups 111-114 can be configured to include 40 servers and 9 databases or database partitions of financial data (e.g., database shards), according to one embodiment. The servers can be configured to provide Internet interfaces, application services, and database hosting, according to one embodiment. Each of the hardware asset groups 111-114 include a financial service application 115 and application data 116, that support hosting financial services, according to one embodiment. Each of the hardware asset groups 111-114 are configured to execute the financial service application 115 and to receive, store, and manage the application data 116 (e.g., user data) in one or more databases, according to one embodiment. Although each hardware asset group 111-114 executes the financial service application 115, it is to be understood that each of the hardware asset groups is executing one or more different instances of the financial services application 115, than those instances that are executed by each other hardware asset group, according to one embodiment. In one embodiment, the code (e.g., the financial services application 115) is developed to be compatible in both hardware asset computing environments and virtual asset computing environments, according to one embodiment.

Each of the hardware asset groups 111-114 are compartmentalized, functionally separated, and/or logically divided within the hardware asset computing environment 110 to provide financial services to one or more groups of users, independent of the services provided by each other hardware asset group, according to one embodiment. For example, the hardware asset groups 111-114 can be assigned to provide services to users based on a user ID, based on a geographic location of the user, and/or based on a characteristic of the user, according to one embodiment. For example, if the financial service has 4 million users, the first hardware asset group 111 can be configured to provide financial services to the first million users, the second hardware asset group 112 can be configured to provide financial services to the second million users, and so forth, according to one embodiment. In another embodiment, the first hardware asset group 111 can be configured to provide financial services to users located in North America, the second hardware asset group 112 can be configured to provide financial services to users located in South America, the third hardware asset group 113 can be configured to provide financial services to users located in Europe, and so forth, according to one embodiment.

The hardware asset computing environment 110 is configured to transfer the hosting of financial services for one or more of the hardware asset groups 111-114 to the virtual asset computing environment 130, according to one embodiment. Using the fourth hardware asset group 114 as an example, the hardware asset computing environment 110 is configured to initially encrypt the application data 116 for the fourth hardware asset group 114, according to one embodiment. In one embodiment, the application data 116 is categorized into a first group of data and the second group of data, and only the first group of data (e.g., secret, sensitive, or important data) is encrypted to decrease the duration of the encryption process. The hardware asset computing environment 110 is configured to transfer the application data 116 to a storage device and encrypt the application data 116 either before or after the application data 116 is transferred to the storage device, according to one embodiment. By encrypting the application data 116, the application data 116 will not be compromised in the event that the storage device is lost, stolen, or the like, according to one embodiment.

The hardware asset computing environment 110 also transfers a virtual asset configuration script to the storage device, in addition to the encrypted version of the application data 116, to configure one or more virtual assets in the virtual asset computing environment 130 to provide financial services with a similar architecture as the hardware asset computing environment 110, according to one embodiment. The virtual asset configuration script and the encrypted version of application data 116 for the fourth hardware asset group constitute a virtual asset installation package, according to one embodiment.

The storage device containing the virtual asset installation package is delivered to the virtual asset computing environment 130 using a parcel courier, according to one embodiment. The delivery of the virtual asset installation package is represented by path 105 in the production environment 100, according to one embodiment. The parcel courier includes one or more of a number of private or public parcel couriers, according to one embodiment. Because application data 116 can be a large number of terabytes, e.g., 60 terabytes, the transfer of the application data 116 from the hardware asset computing environment 110 to the virtual asset computing environment 130 via the network 101 can consume days, weeks, or months, whereas delivery of the application data 116 via parcel courier can occur, for example, by overnight delivery, according to one embodiment. Additionally, the delivery of the application data 116 by parcel courier protects the application data from exposure to potential online security threats, e.g., online hacking, according to one embodiment.

The virtual asset computing environment 130 is configured to receive and install a virtual asset installation package from the hardware asset computing environment 110, to heterogeneously provide financial services to users concurrently with the hardware asset computing environment 110, according to one embodiment. The virtual asset computing environment 130 includes a virtual asset manager 131 and virtual assets 132, according to one embodiment. The virtual asset manager 131 configures, monitors, and/or manages the virtual assets 132 within the virtual asset computing environment 130, according to one embodiment. The virtual asset manager 131 is communicatively coupled to the virtual assets 132 through a backend communication channel 106, according to one embodiment. In one embodiment, the virtual asset manager 131 is hosted independently from the virtual asset computing environment, according to one embodiment. The virtual assets 132, as discussed above, are elastic and/or dynamic allocations and de-allocations of virtual servers, virtual machines, computer processor capacity, computer processor speed, memory allocations, and/or network bandwidth that are selectively provided to or shared between one or more tenants of the virtual asset computing environment 130, according to one embodiment. A tenant, such as the financial service provider, another user, or another company is allocated selectable portions of the virtual assets of the virtual asset computing environment 130, in accordance with arrangements made between the tenants and the virtual asset service provider, according to one embodiment.

The virtual asset manager 131 includes the virtual asset installation package 133, a security policy 134, a traffic analytics engine 135, a traffic management policy 136, and a virtual asset configuration engine 137, according to one embodiment. The virtual asset manager 131 and the virtual asset computing environment 130 are configured to automate infrastructure code, testing, application/database stack creation, network routing, and the like, to support hosting the financial services from the virtual asset computing environment 130, according to one embodiment.

The virtual asset installation package 133 is received from the hardware asset computing environment 110 to transfer one or more services, e.g., online financial services, from the hardware asset computing environment 110 to the virtual asset computing environment 130, according to one embodiment. The virtual asset installation package 133 includes a virtual asset configuration script 138 that is configured to be executed within the virtual asset computing environment 130 and configures the virtual assets 132 to support and provide financial services operations from the virtual asset computing environment 130, according to one embodiment. The virtual asset installation package 133 also includes fourth hardware asset group application data 139, which represents an encrypted version of the application data 116 of the fourth hardware asset group 114, according to one embodiment. The virtual asset computing environment 130 is configured to use the virtual asset configuration script 138 and the fourth hardware asset group application data 139 to establish Internet interface servers, application servers, and database servers within the virtual assets 132, in an architecture that is similar to the architecture used in the hardware asset computing environment 110, according to one embodiment.

The security policies 134 includes secrets, such as encryption keys and passwords, and includes policies for the distribution, refreshment, and management of secrets that are applied to virtual assets, according to one embodiment. The security policy 134 is managed by the financial service provider so that the financial service provider manages security of the hosted financial service and its associated application data, according to one embodiment.

The traffic analytics engine 135 monitors the quantity of user traffic, the frequency of user traffic, CPU percentages used, memory consumption, and other characteristics of the virtual assets 132 that are configured to support and provide the operation of the financial services, according to one embodiment.

The traffic management policy 136 receives traffic analytics for a traffic analytics engine 135 and expands or reduces the quantity of virtual assets that are allocated to support the operation of the financial services from the virtual asset computing environment 130, according to one embodiment. Traffic management policy 136 can include one or more rules that determine whether to increase or decrease the quantity of virtual assets that are allocated/dedicated to the operation of the financial services from the virtual asset computing environment 130, according to one embodiment. For example, the traffic management policy 136 may include a rule for increasing a quantity of allocated virtual servers if 90 percent of the CPU processing capabilities are consumed while hosting the financial services, for greater than a predetermined period of time (e.g., 12 hours), according to one embodiment. In one embodiment, the traffic management policy 136 uses the virtual asset configuration engine 137 to expand or reduce the quantity of virtual assets that are allocated to support the operation of the financial services, according to one embodiment. In other embodiments, the virtual asset configuration engine 137 receives instructions from the financial service provider or other tenants of the virtual asset computing environment 130 to expand or reduce quantities of virtual assets allocated to one or more particular functions, according to one embodiment.

The virtual assets 132 include a first virtual asset group 140 for hosting the financial services that were previously provided by the fourth hardware asset group 114 from the hardware asset computing environment 110, according to one embodiment. The first virtual asset group 140 is created within the virtual asset computing environment 130 as a result of executing the virtual asset installation package 133, according to one embodiment. The first virtual asset group 140 includes a first virtual asset configuration 141, first public network interface servers 142, first application servers 143, and first database servers 144, according to one embodiment. The first virtual asset configuration 141 determines a configuration hierarchy, public subnets, private subnets, network address translators, software routers, communication protocols, and/or particular virtual asset allocations associated with the first public network interface servers 142, the first application servers 143, and the first database servers 144, according to one embodiment. The first public network interface servers 142 are configured to receive data from and transmit data to users and computing systems that are accessible through public networks, such as the Internet, according to one embodiment. The first application servers 143 are configured to receive user data, execute the financial service application 115, and manage application data within the first database servers 144, according to one embodiment. It is to be understood that the first application servers 143 are executing one or more different instances of the financial service application 115 than are executed by the hardware asset computing environment 110 or than are executed by other virtual asset groups within the virtual asset computing environment, according to one embodiment. The first database servers 144 include the fourth hardware asset group application data 139, according to one embodiment.

The first virtual asset group 140 can include one or more allocations of virtual assets to provide financial services to users, according to one embodiment. For example, the first public network interface servers 142 can include tens, hundreds, or thousands of virtual servers, according to one embodiment. Similarly, the first application servers 143 and the first database servers 144 can also include tens, hundreds, or thousands of virtual servers allocated to the use of the first virtual asset group 140 for providing financial services to users, e.g., the user 121, according to one embodiment.

The first virtual asset group 140 is configured to communicate with third-party services and financial service provider's telecommunication services, according to one embodiment. For example, the first virtual asset group 140 provides financial services that are configured to communicate with third-party services such as Apple and Silver pop to provide push notifications to applications that provide email notifications, according to one embodiment. The first virtual asset group 140 is configured to provide financial services by using other telecommunications services, which include, but are not limited to, text messages, voicemail messages, email notifications, and push notifications, according to one embodiment.

Upon creation of the first virtual asset group 140, the virtual asset computing environment 130 is configured to synchronize the first database servers 144 with the application data 116 of the fourth hardware asset group 114, according to one embodiment. Between delivering the virtual asset installation package 133 from the hardware asset computing environment 110 to the virtual asset computing environment 130, the application data 116 is altered by the fourth hardware asset group 114 continuing to provide financial services to one or more users, according to one embodiment. The virtual asset computing environment 130 synchronizes the first database servers 144 with the application data 116 of the fourth hardware asset group 114 so that the first database servers 144 are representative of up-to-date data, according to one embodiment.

After the data of the first virtual asset group 140 is synchronized with the data of the fourth hardware asset group 114, the service provider tests the operations of the first virtual asset group 140 to ensure that end-users, e.g., customers, will not be delivered faulty services, according to one embodiment. The virtual asset computing environment 130 can be configured to test the financial services provided by the first virtual asset group 140 with one or more test scripts, according to one embodiment.

The production environment 100 is configured to redirect financial services traffic from the hardware asset computing environment 110, e.g., from the fourth hardware asset group 114, to the first virtual asset group 140, according to one embodiment. In other words, once the first virtual asset group 140 has received the application data 116 from the fourth hardware asset group 114, and once the first virtual asset group 140 is configured to provide the same financial services as the fourth hardware asset group 114, the virtual asset computing environment 130 configures the first virtual asset group 140 to be the primary host of financial services, according to one embodiment. When the first virtual asset group 140 is changed to be the primary host of financial services for a subset of the financial services users, the fourth hardware asset group 114 is changed to be the secondary or backup host of financial services for the subset of the financial services users, according to one embodiment.

The virtual asset computing environment 130 is configured to selectively add a second virtual asset group 145 to the virtual assets 132 in response to increased traffic to the first virtual asset group 140, depletion of capacity of virtual resources in the first virtual asset group 140, and/or in response to a request to transfer additional services from the hardware asset computing environment 110, according to one embodiment. The second virtual asset group 145 includes a second virtual asset configuration 146, second public network interface servers 147, second application servers 148 for executing the financial service application 115, and second database servers 149, according to one embodiment. The components of the second virtual asset group 145 can be configured in a similar manner as the components of the first virtual asset group 140, according to one embodiment. The second virtual asset group 145 can represent an increase in virtual assets allocated to the first public network interface servers 142, an increase in virtual assets allocated to the first application servers 143, and/or an increase in the virtual assets allocated to the first database servers 144, according to one embodiment. Alternatively, the second virtual asset group 145 can be configured to provide financial services to users as a primary host and as a replacement of one or more of the hardware asset groups 111-113 or as a replacement of one or more other hardware asset groups within the hardware asset computing environment 110, according to one embodiment. Although the virtual assets 132 are illustrated as including the first virtual asset group 140 and optionally the second virtual asset group 145, it is to be understood that the virtual assets 132 can include many virtual asset groups that are configured to host financial services concurrently with or as a replacement of financial services that are hosted by the hardware asset computing environment 110, according to one embodiment. In one embodiment, within the virtual assets 132, the first virtual asset group 140 is hosted in a different region or in a different availability zone as the second virtual asset group 145 so that a natural disaster or other loss of some of the virtual assets 132 does not affect all of the virtual asset groups that are hosting the financial services, according to one embodiment. As used herein, computing resources located in one region are designed to operate completely isolated from computing resources in other regions, according to one embodiment. Each region includes multiple availability zones, and each availability zone is designed to be isolated from other availability zones while being connected to the other availability zones through low-latency links, according to one embodiment.

As described above, the production environment 100 is configured to enable the transfer of hosting of financial services from the hardware asset computing environment 110 to the virtual asset computing environment 130, according to one embodiment. The transfer of hosting of financial services enables established online services to be migrated to elastic and dynamic virtual asset computing environments without interrupting the services provided to users, according to one embodiment. The transfer of hosting a financial services to the virtual asset computing environment 130 also enables concurrent and heterogeneous hosting of the financial services by the virtual asset computing environment 130 and the hardware asset computing environment 110 so that the financial service provider can conduct long-term evaluations of hardware asset hosting and virtual asset hosting to determine which type of hosting provides the most advantages to the financial service provider over a period of time, according to one embodiment. Transitioning financial service hosting from the hardware asset computing environment 110 to the virtual asset computing environment 130 provides inherent disaster recovery, reduces cost of hosting, provides faster scalability, and ensures availability of the financial service, according to one embodiment.

Figure 2:
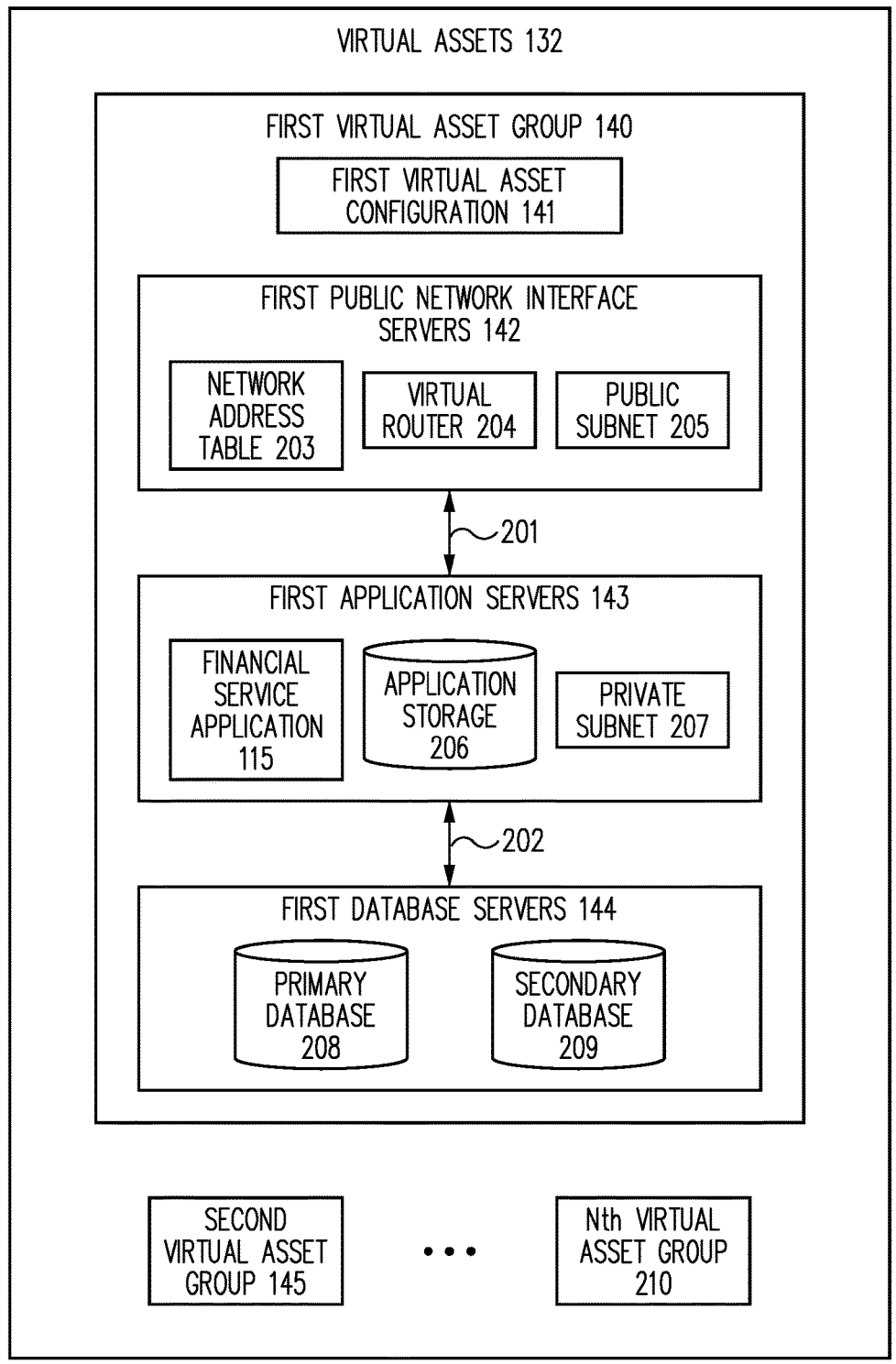
FIG. 2 is a block diagram of virtual assets configured to provide financial services from a virtual asset computing environment, in accordance with one embodiment.

FIG. 2 illustrates a block diagram which includes additional features of the virtual assets 132 and the first virtual asset group 140, according to one embodiment.

In one embodiment, the first virtual asset group 140 includes an architecture that is associated with a non-trusted computing environment, to protect the application data received from users of the financial service system, according to one embodiment. The first virtual asset group 140 is configured with an architecture that is associated with infrastructure as a service, and the architecture of the first virtual asset group 140 includes software representations of hardware components use within the hardware asset computing environment 110, according to one embodiment. In one embodiment, the Internet Protocol ("IP") addresses are dynamic and change within the virtual asset computing environment 130, so the architecture of the first virtual asset group 140 is not hard-coded to a particular IP address. In one embodiment, the first public network interface servers 142 are communicatively coupled to the first application servers 143 with a communication channel 201, and the first application servers 143 are communicatively coupled to the first database servers 144 with a communication channel 202. In one embodiment, the communication channels 201 and 202 employ secure sockets layer ("SSL") communications to protect information that is transmitted within the first virtual asset group 140, according to one embodiment.

In one embodiment, the first public network interface servers 142 include a network address translator 203, a virtual router 204, and a public subnet 205, according to one embodiment. The network address translator 203 is used to assign a public address to the first public network interface servers 142 that are within the public subnet 205, according to one embodiment. The virtual router 204 provides software-based router functionality to replace, for example, the function of an F5 router, according to one embodiment. The first public network interface servers 142 terminate SSL communications using techniques that are similar to those use within a hardware router, e.g., an F5 router, according to one embodiment. The first public network interface servers 142 are also configured to perform elastic load balancing, according to one embodiment. The first public network interface servers 142 are also configured to direct traffic to public networks through a Linux Virtual Data Channel ("LVDC") network to provide an additional layer of protection to the first public network interface servers 142, according to one embodiment.

The first application servers 143 represent an application layer within the architecture of the first virtual asset group 140, according to one embodiment. The first application servers 143 host the financial services application 115 and also include application storage 206 and a private subnet 207, according to one embodiment. The application storage 206 is one or more virtual assets configured to store application data for use by the financial services application 115, according to one embodiment.

The first database servers 144 include a primary database 208 and a secondary database 209, according to one embodiment. The primary database 208 and the secondary database 209 can be implemented with virtual assets that are in different regions or that are in different availability zones, according to one embodiment.

In one embodiment, the first public network interface servers 142 are implemented with one or more virtual asset or virtual asset instances, which are different than one or more virtual assets used to implement the first application servers 143, which are different than one or more virtual assets used to implement the first database servers 144, according to one embodiment.

The virtual assets 132 include the first virtual asset group 140 and the second virtual asset group 145, according to one embodiment. The virtual assets 132 can include several virtual asset groups that are configured to provide the financial service to users through the network 101, and the virtual assets can include up to an Nth virtual asset group 210, according to one embodiment. In one embodiment, the Nth virtual asset group 210 represents a tenth, a hundredth, a thousandth, a ten-thousandth, or so forth, virtual asset group.

Process

Figure 3:
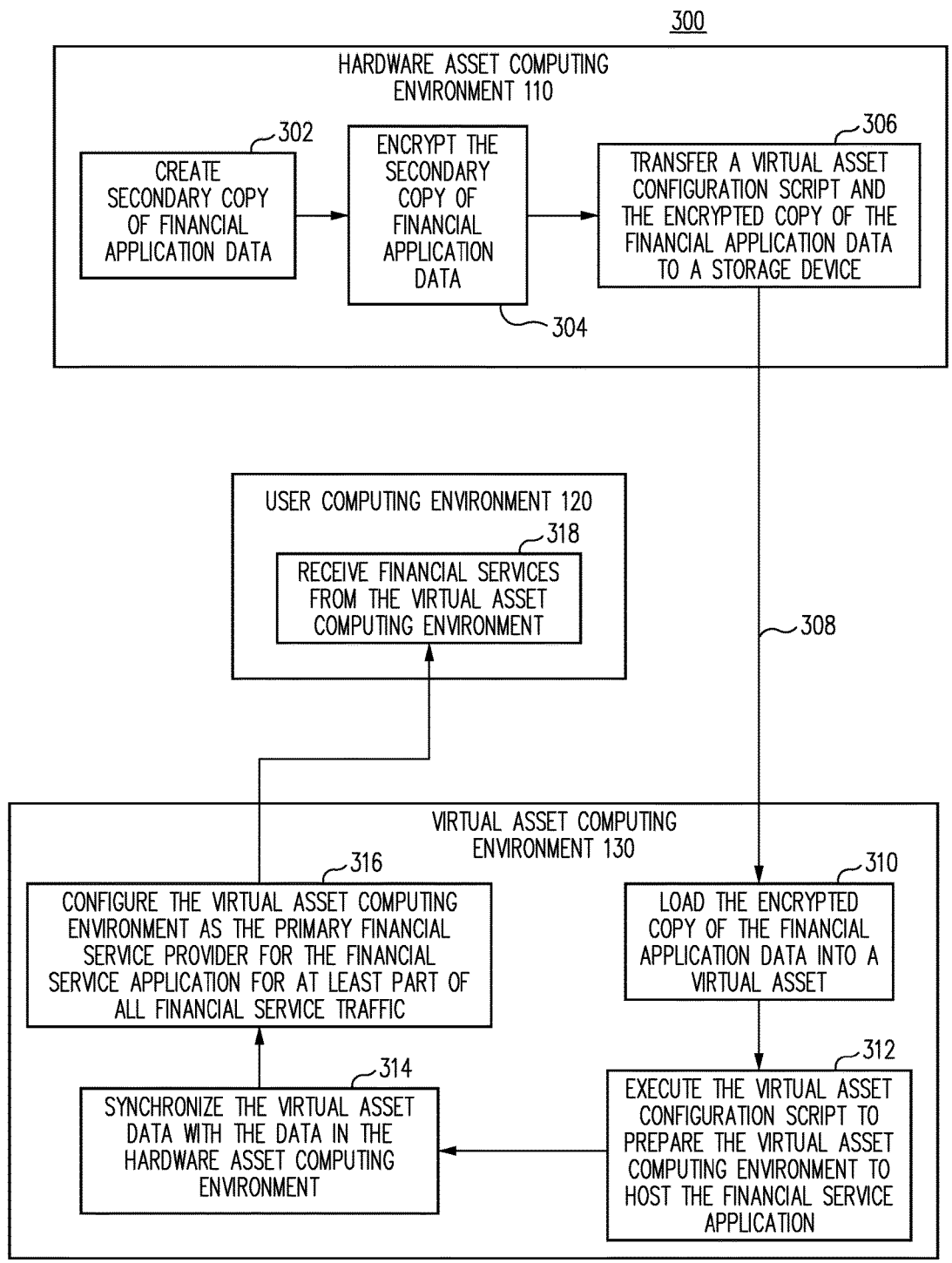
FIG. 3 is a flow diagram of a process for transferring the hosting of financial services to a virtual asset computing environment from a hardware asset computing environment, in accordance with one embodiment.

FIG. 3 illustrates a flow diagram of a process 300 for transferring hosting of a financial service from the hardware asset computing environment 110 to the virtual asset computing environment 130 to provide financial services, according to one embodiment.

At block 302, the hardware asset computing environment 110 create a secondary copy of financial application data, according to one embodiment.

At block 304, the hardware asset computing environment 110 encrypt the secondary copy of the financial application data, according to one embodiment.

At block 306, the hardware asset computing environment 110 transfers a virtual asset configuration script and the encrypted copy of the financial application data to a storage device, according to one embodiment.

Path 308 represents transferring the virtual asset configuration script and the encrypted copy of the financial application data from the hardware asset computing environment 110 to the virtual asset computing environment 130 via a parcel courier, according to one embodiment.

At block 310, the virtual asset computing environment 130 loads the encrypted copy of the financial application data into a virtual asset, according to one embodiment. In one embodiment, the virtual asset computing environment 130 loads the encrypted copy of the financial application data into multiple virtual assets which are geographically separated from one another.

At block 312, the virtual asset computing environment 130 executes the virtual asset configuration script to prepare the virtual asset computing environment to host the financial service application, according to one embodiment.

At block 314, the virtual asset computing environment 130 synchronizes the virtual asset data with the data in the hardware asset computing environment, according to one embodiment.

At block 316, the virtual asset computing environment 130 configures the virtual asset computing environment as the primary financial service provider for the financial service application, for at least a part of all financial service traffic, according to one embodiment.

At block 318, the user computing environment 120 receives financial services from the virtual asset computing environment, according to one embodiment.

Figure 4:
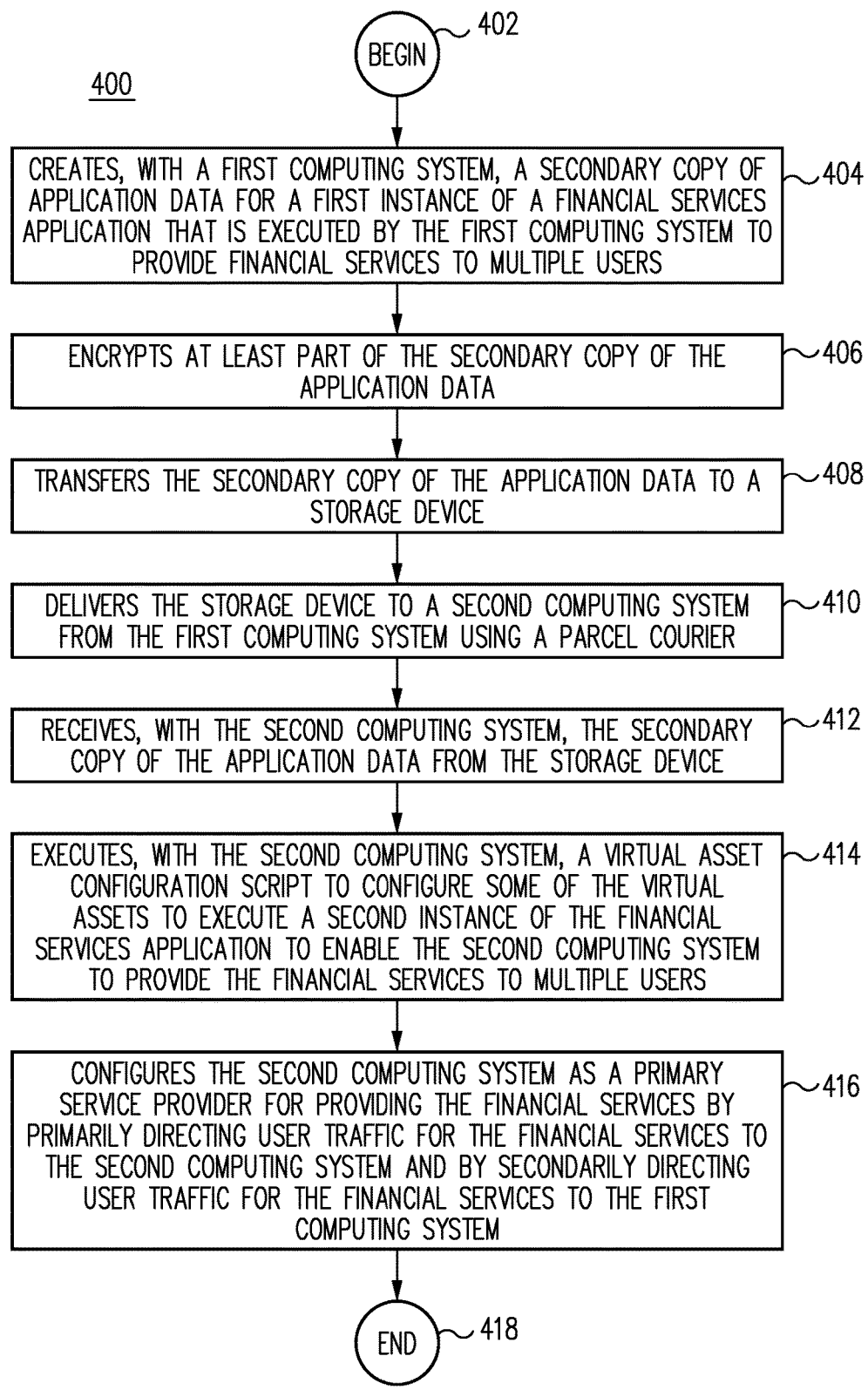
FIG. 4 is a flow diagram of a process for transferring the hosting of financial services to a virtual asset computing environment from a hardware asset computing environment, in accordance with one embodiment.

FIG. 4 illustrates a flow diagram of a process 400 for transferring financial services hosting to a virtual asset computing environment from a hardware asset computing environment, according to one embodiment.

At block 402, the process begins.

At block 404, the process creates, with a first computing system, a secondary copy of application data for a first instance of a financial services application that is executed by the first computing system to provide financial services to multiple users, according to one embodiment. The first computing system is a hardware asset computing environment, according to one embodiment.

At block 406, the process encrypts at least part of the secondary copy of the application data, according to one embodiment.

At block 408, the process transfers the secondary copy of the application data to a storage device, according to one embodiment.

At block 410, the process delivers the storage device to a second computing system from the first computing system using a parcel courier, according to one embodiment.

At block 412, the process receives, with the second computing system, the secondary copy of the application data from the storage device, according to one embodiment. The second computing system is a virtual asset computing environment, and the virtual asset computing environment dynamically and selectively allocates and de-allocates virtual assets to support one or more services hosted from the virtual asset computing environment, according to one embodiment.

At block 414, the process executes, with the second computing system, a virtual asset configuration script to configure some of the virtual assets to execute a second instance of the financial services application to enable the second computing system to provide the financial services to multiple users, according to one embodiment.

At block 416, the process configures the second computing system as a primary service provider for providing the financial services by primarily directing user traffic for the financial services to the second computing system and by secondarily directing user traffic for the financial services to the first computing system, according to one embodiment.

At block 418, the process ends.

As noted above, the specific illustrative examples discussed above are but illustrative examples of implementations of embodiments of the method or process for individualizing the tax return preparation interview with an interchangeable, e.g., modular, analytics module. Those of skill in the art will readily recognize that other implementations and embodiments are possible. Therefore the discussion above should not be construed as a limitation on the claims provided below.

In accordance with one embodiment, a computing system implemented method transfers financial services hosting to a virtual asset computing environment from a hardware asset computing environment, according to one embodiment. The method includes creating, with a first computing system, a secondary copy of application data for a first instance of a financial services application that is executed by the first computing system to provide financial services to multiple users, according to one embodiment. The first computing system is a hardware asset computing environment, according to one embodiment. The method includes encrypting at least part of the secondary copy of the application data, according to one embodiment. The method includes transferring the secondary copy of the application data to a storage device, according to one embodiment. The method includes delivering the storage device to a second computing system from the first computing system using a parcel courier, according to one embodiment. The method includes receiving, with the second computing system, the secondary copy of the application data from the storage device, according to one embodiment. The second computing system is a virtual asset computing environment, according to one embodiment. The virtual asset computing environment dynamically and selectively allocates and de-allocates virtual assets to support one or more services hosted from the virtual asset computing environment, according to one embodiment. The method includes executing, with the second computing system, a virtual asset configuration script to configure some of the virtual assets to execute a second instance of the financial services application to enable the second computing system to provide the financial services to the multiple users, according to one embodiment. The method includes configuring the second computing system as a primary service provider for providing the financial services by primarily directing user traffic for the financial services to the second computing system and by secondarily directing user traffic for the financial services to the first computing system, according to one embodiment.

In accordance with one embodiment, a computer-readable medium has a plurality of computer-executable instructions which, when executed by a processor, perform a method for configuring virtual assets to host a financial service that is concurrently hosted by a hardware asset computing environment. The instructions include a virtual asset manager configured to dynamically allocate and de-allocate virtual assets within a virtual asset computing environment to support the execution of a financial services application to provide financial services to multiple users through a public network, according to one embodiment. The virtual asset manager applies security policies to the virtual assets to reduce a likelihood of compromising financial application data to potential security threats, according to one embodiment. The virtual asset manager monitors usage characteristics of the virtual assets to determine when to allocate additional virtual assets to support the execution of the financial services application, according to one embodiment. The instructions include a virtual asset group of the virtual assets, according to one embodiment. The virtual asset group includes financial services data received by a parcel courier service from a hardware asset computing environment that is configured to concurrently execute an instance of the financial services application to concurrently provide the financial services, according to one embodiment. The virtual asset group includes database servers, application servers, and public network interface servers, configured to provide the financial services to the multiple users, according to one embodiment.

In accordance with one embodiment, a system transfers financial services hosting to a virtual asset computing environment from a hardware asset computing environment. The system includes at least one processor, and at least one memory coupled to the at least one processor, according to one embodiment. The at least one memory stores instructions which, when executed by any set of the one or more processors, perform a process for transferring financial services hosting to a virtual asset computing environment from a hardware asset computing environment, according to one embodiment. The process includes creating, with a first computing system, a secondary copy of application data for a first instance of a financial services application that is executed by the first computing system to provide financial services to multiple users, according to one embodiment. The first computing system is a hardware asset computing environment, according to one embodiment. The process includes encrypting at least part of the secondary copy of the application data, according to one embodiment. The process includes transferring the secondary copy of the application data to a storage device, according to one embodiment. The process includes delivering the storage device to a second computing system from the first computing system using a parcel courier, according to one embodiment. The process includes receiving, with the second computing system, the secondary copy of the application data from the storage device, according to one embodiment. The second computing system is a virtual asset computing environment, and the virtual asset computing environment dynamically and selectively allocates and de-allocates virtual assets to support one or more services hosted from the virtual asset computing environment, according to one embodiment. The process includes executing, with the second computing system, a virtual asset configuration script to configure some of the virtual assets to execute a second instance of the financial services application to enable the second computing system to provide the financial services to the multiple users, according to one embodiment. The process includes configuring the second computing system as a primary service provider for providing the financial services by primarily directing user traffic for the financial services to the second computing system and by secondarily directing user traffic for the financial services to the first computing system, according to one embodiment.

By transferring the hosting of a financial service from a hardware asset computing environment to a virtual asset computing environment, implementation of embodiments of the present disclosure allows for significant improvement to the field of financial management, data flow, data distribution, and distributive computing. As one illustrative example, by enabling the full or partial transfer of established online services to cloud computing environments, implementation of embodiments of the present disclosure allows for growth in the cloud computing industry, allows for service providers to reduce the quantity of standby computing equipment, and therefore reduces the amount of electricity, space, and cost associated with equipment that is configured to accommodate fluctuations in customer base and in customer usage of an online service. As a result, embodiments of the present disclosure allow for improved/efficient processor use, more efficient use of memory access and data storage capabilities, reduced communication channel bandwidth utilization, and therefore faster communications connections. Consequently, computing and communication systems implementing and/or providing the embodiments of the present disclosure are transformed into faster and more operationally efficient devices and systems.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for transferring a hosting of online services to a virtual asset computing environment from a hardware asset computing environment, comprising:

creating, with a first computing system, a secondary copy of application data for a first instance of an online services application that is executed by the first computing system to provide online services to multiple users,
wherein the first computing system is a hardware asset computing environment;
encrypting at least part of the secondary copy of the application data;
transferring the secondary copy of the application data to a storage device;
delivering the storage device to a second computing system from the first computing system using a parcel courier;
receiving, with the second computing system, the secondary copy of the application data from the storage device,
wherein the second computing system is a virtual asset computing environment,
wherein the virtual asset computing environment dynamically and selectively allocates and de-allocates virtual assets to support one or more services hosted from the virtual asset computing environment;
executing, with the second computing system, a virtual asset configuration script to configure some of the virtual assets to execute a second instance of the online services application to enable the second computing system to provide the online services to the multiple users; and configuring the second computing system as a primary service provider for providing the online services by primarily directing user traffic for the online services to the second computing system and by secondarily directing user traffic for the online services to the first computing system.

2. The method of claim 1, further comprising:
updating the secondary copy of the application data on the second computing system with the secondary copy of the application data on the first computing system.

3. The method of claim 1, further comprising:
compartmentalizing hardware assets of the first computing system into subsets of hardware assets configured to service subsets of the multiple users,
wherein the first instance of the online services application is associated with one of the subsets of hardware assets and is dedicated to providing the online services to one of the subsets of the multiple users,
wherein the second instance of the online services application is configured to providing the online services to the one of the subsets of multiple users.

4. The method of claim 1, further comprising:
transferring the virtual asset configuration script to the storage device prior to delivering the storage device to the second computing system from the first computing system.

5. The method of claim 1, further comprising:
monitoring the user traffic to the some of the virtual assets that are configured to execute the second instance of the online services application; and
increasing a quantity of virtual assets allocated to providing the online services from the second computing system, in response to the user traffic exceeding a predetermined threshold.

6. The method of claim 1, further comprising:
monitoring usage characteristics of the some of the virtual assets that are configured to execute the second instance of the online services application; and
increasing a quantity of virtual assets allocated to providing the online services from the second computing system, in response to the usage characteristics exceeding a predetermined threshold.

7. The method of claim 6, wherein the usage characteristics include percentage of processing capacity, volatile memory capacity, and non-volatile memory capacity.

8. The method of claim 1, wherein executing the configuration script includes configuring the some of the virtual assets as first public network interface servers as protection between the secondary copy of the application data and publically accessible networks.

9. The method of claim 1, wherein executing the configuration script includes configuring the some of the virtual assets as application servers and as database servers to support providing the online services to the multiple users.

10. The method of claim 9, wherein executing the configuration script includes configuring the application servers and the database servers to communicate using secured communications protocols within the second computing system.

11. The method of claim 1, wherein executing the configuration script includes configuring the some of the virtual assets as a software router between publically available networks and the second instance of the online services application.

12. A computer-readable medium having a plurality of computer-executable instructions which, when executed by a processor, perform a method for configuring virtual assets to host an online service that is concurrently hosted by a hardware asset computing environment, the instructions comprising:
a virtual asset manager configured to dynamically allocate and de-allocate virtual assets within a virtual asset computing environment to support the execution of an online services application to provide online services to multiple users through a public network,
wherein the virtual asset manager applies security policies to the virtual assets to reduce a likelihood of compromising online application data to potential security threats,
wherein the virtual asset manager monitors usage characteristics of the virtual assets to determine when to allocate additional virtual assets to support the execution of the online services application; and
a virtual asset group of the virtual assets,
wherein the virtual asset group includes online services data received by a parcel courier service from a hardware asset computing environment that is configured to concurrently execute an instance of the online services application to concurrently provide the online services,
wherein the virtual asset group includes database servers, application servers, and public network interface servers, configured to provide the online services to the multiple users.

13. The computer-readable medium of claim 12, wherein the virtual asset manager unencrypts the online services data prior to copying the online services data to the database servers.

14. The computer-readable medium of claim 12, wherein the public network servers are configured with a public subnet within the virtual asset computing environment,
wherein the application servers are configured with a private subnet within the virtual asset computing environment,
wherein the database servers are configured with a private subnet within the virtual asset computing environment.

15. The computer-readable medium of claim 12, wherein the public network servers, the application servers, and the database servers communicate to each other using secured communications protocols within the virtual asset computing environment.

16. The computer-readable medium of claim 12, wherein the virtual asset group includes a software architecture that mirrors a hardware architecture used in the hardware asset computing environment to provide the online services.

17. A system for transferring a hosting of online services to a virtual asset computing environment from a hardware asset computing environment, the system comprising:
at least one processor; and
at least one memory coupled to the at least one processor, the at least one memory having stored therein instructions which, when executed by any set of the one or more processors, perform a process for transferring a hosting of online services to a virtual asset computing environment from a hardware asset computing environment, the process including:
creating, with a first computing system, a secondary copy of application data for a first instance of an online services application that is executed by the first computing system to provide online services to multiple users, wherein the first computing system is a hardware asset computing environment;

encrypting at least part of the secondary copy of the application data;

transferring the secondary copy of the application data to a storage device;

delivering the storage device to a second computing system from the first computing system using a parcel courier;

receiving, with the second computing system, the secondary copy of the application data from the storage device, wherein the second computing system is a virtual asset computing environment, wherein the virtual asset computing environment dynamically and selectively allocates and de-allocates virtual assets to support one or more services hosted from the virtual asset computing environment;

executing, with the second computing system, a virtual asset configuration script to configure some of the virtual assets to execute a second instance of the online services application to enable the second computing system to provide the online services to the multiple users; and configuring the second computing system as a primary service provider for providing the online services by primarily directing user traffic for the online services to the second computing system and by secondarily directing user traffic for the online services to the first computing system.

18. The system of claim 17, wherein the process further comprises:

updating the secondary copy of the application data on the second computing system with the secondary copy of the application data on the first computing system.

19. The system of claim 17, wherein the process further comprises:

compartmentalizing hardware assets of the first computing system into subsets of hardware assets configured to service subsets of the multiple users, wherein the first instance of the online services application is associated with one of the subsets of hardware assets and is dedicated to providing the online services to one of the subsets of the multiple users, wherein the second instance of the online services application is configured to providing the online services to the one of the subsets of multiple users.

20. The system of claim 17, wherein the process further comprises:

transferring the virtual asset configuration script to the storage device prior to delivering the storage device to the second computing system from the first computing system.

21. The system of claim 17, wherein the process further comprises:

monitoring the user traffic to the some of the virtual assets that are configured to execute the second instance of the online services application; and increasing a quantity of virtual assets allocated to providing the online services from the second computing system, in response to the user traffic exceeding a predetermined threshold.

22. The system of claim 17, wherein the process further comprises:

monitoring usage characteristics of the some of the virtual assets that are configured to execute the second instance of the online services application; and increasing a quantity of virtual assets allocated to providing the online services from the second computing system, in response to the usage characteristics exceeding a predetermined threshold.

23. The system of claim 22, wherein the usage characteristics include percentage of processing capacity, volatile memory capacity, and non-volatile memory capacity.

24. The system of claim 17, wherein executing the configuration script includes configuring the some of the virtual assets as first public network interface servers as protection between the secondary copy of the application data and publically accessible networks.

25. The system of claim 17, wherein executing the configuration script includes configuring the some of the virtual assets as application servers and as database servers to support providing the online services to the multiple users.

26. The system of claim 25, wherein executing the configuration script includes configuring the application servers and the database servers to communicate using secured communications protocols within the second computing system.

27. The system of claim 17, wherein executing the configuration script includes configuring the some of the virtual assets as a software router between publically available networks and the second instance of the online services application.

* * * * *